United States Patent [19]
Sheinkman et al.

[11] 3,792,340
[45] Feb. 12, 1974

[54] METHOD OF AND APPARATUS FOR CONTROLLING THE PERFORMANCE OF A D.C. MAGNETOHYDRODYNAMIC GENERATOR

[76] Inventors: Vladislav Solomonovich Sheinkman, Angarskaya ulitsa, 61, kv. 18; Sergei Illarionovich Pischikov, Angarskaya ulitsa, 61, kv. 20; Boris Nikolaevich Sergeenkov, Federativny prospekt, 42, kv. 10, all of Moscow, U.S.S.R.

[22] Filed: Sept. 27, 1972

[21] Appl. No.: 292,805

[52] U.S. Cl. .................................. 322/7, 310/11
[51] Int. Cl. ................................ H02k 45/00
[58] Field of Search ...................... 310/11; 322/7

[56] References Cited
UNITED STATES PATENTS
3,524,086   8/1970   Lindley .................... 310/11
3,617,781   11/1971  Rosa ....................... 310/11
3,479,537   11/1969  Jenny et al................ 310/11

Primary Examiner—D. F. Duggan
Attorney, Agent, or Firm—Holman & Stern

[57] ABSTRACT

The present invention relates to a method of and an apparatus for controlling the performance of a D.C. magnetohydrodynamic (MHD) generator.

The invention consists in that the performance of the MHD-generator is controlled by means of maintaining the preset value of its electrical load factor, to which end said apparatus performs in succession three functions:

shapes a control signal to periodically vary voltages across the electrodes of the MHD-generator in a discrete manner, determines changes of the MDH-generator active power within every time interval equal to the cycle of discrete variations of voltages across the electrodes and shapes a control signal according to the active power change within said time interval to vary voltages across the electrodes of the MDH-generator so as to maintain the preset electrical load factor.

6 Claims, 26 Drawing Figures

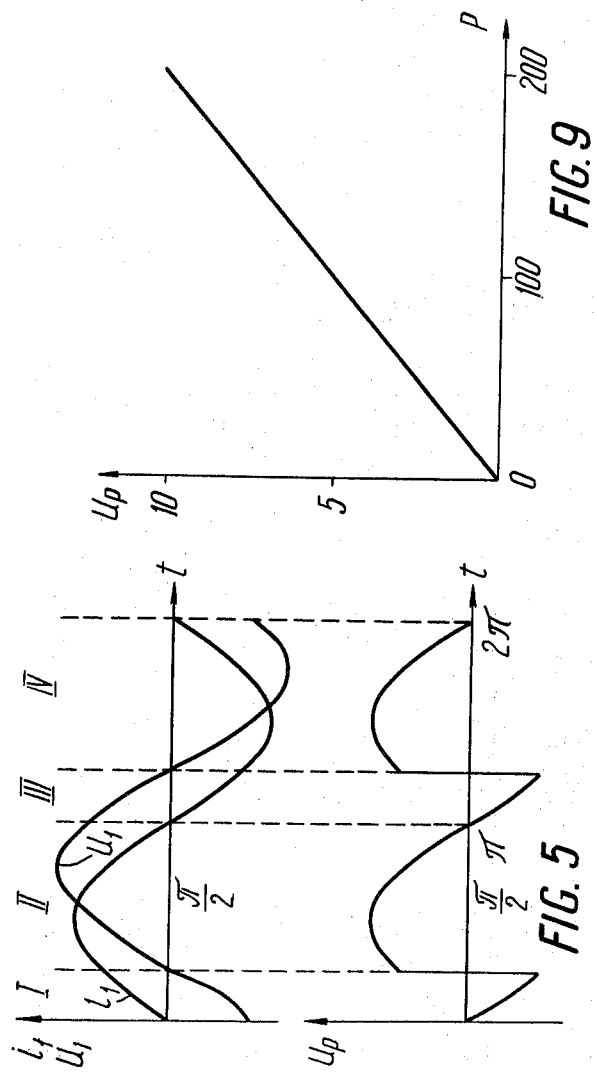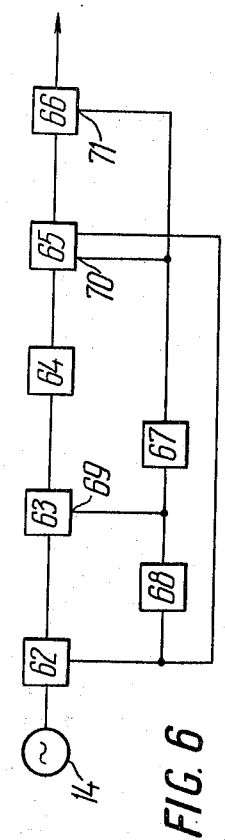

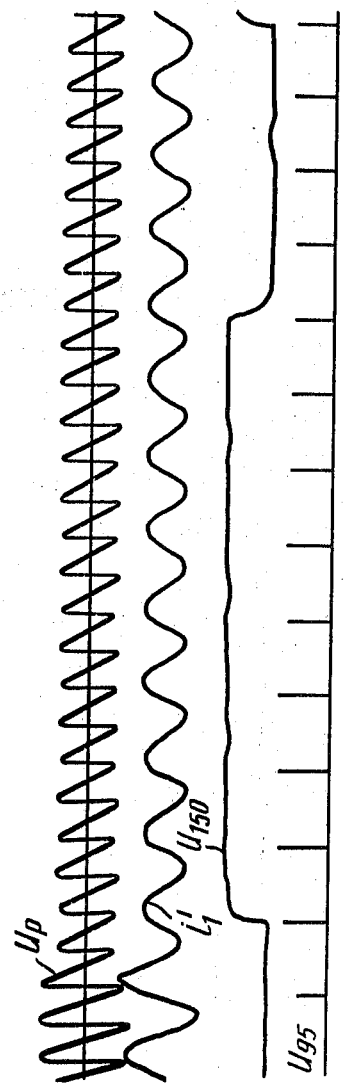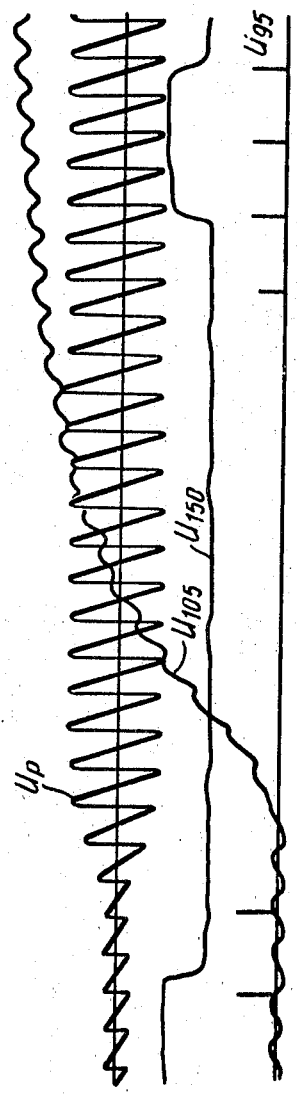

METHOD OF AND APPARATUS FOR CONTROLLING THE PERFORMANCE OF A D.C. MAGNETOHYDRODYNAMIC GENERATOR

The present invention relates to electric power engineering and, more precisely, to D.C. magnetohydrodynamic (MHD) generators and in particular to a method of and an apparatus for controlling the performance of such an MHD-generator.

Known in the prior art is a method of controlling the performance of an MHD-generator according to which the process of adjustment is effected by varying the voltages across the electrodes of the generator, said process consisting in maintaining either a constant voltage (voltage regulation) or a constant current magnitude (current regulation).

The regulation level in this case is changed manually.

This method of controlling the performance of an MHD-generator, however, fails to ensure the required energy characteristics to improve the power performance of the MHD-generator.

The manual adjustment of regulation levels performed separately for every pair of electrodes in the course of the MHD-generator operation is far from rational, since it results, first of all, in that the electrical load conditions are optimized with a considerable delay.

The object of the present invention is to provide another method of controlling an MHD-generator which would ensure that the effective conditions of its load are maintained, as well as to design an apparatus to carry this method into effect.

The invention is based upon the concept of controlling the performance of an MHD-generator in a way that would ensure that the preset value of the electric load factor $\nu_e$ is maintained. However, it must be borne in mind that to maintain the preset value of the electrical load factor automatically, which constitutes one of the major conditions for the MHD-generator operation in the required and especially in the optimum mode, is a relatively complex problem. The difficulty encountered here lies in the fact that, though the parameter $$\nu_e = U_e/E_e \qquad (1)$$

where $U_e$ is the voltage across the electrodes of the MHD-generator, and
$E_e$ is the electromotive force,
is simple, the value of the electromotive force should be determined correctly.

As it is known $$E_e = \int_{y_1}^{y_2} [VB] dy \qquad (2)$$

where $y_1$ and $y_2$ are the coordinates of the electrodes along the Y-axis,
$V$ is the velocity of the plasma flow in the channel of the MHD-generator and
$B$ is the magnetic induction.

The value of the electromotive force varies due to the fact that changes of the load current cause proportional changes of the pressure in the plasma flow, which results in the increase of its velocity due to the growth of the specific volume.

A set-up which would allow continuous direct measurements in this or that way of the plasma velocity in separate sections of the MHD-generator channel, with the results being introduced into the control circuit together with the respective values of the magnetic induction and the gap between the electrodes, is not quite feasible. In addition to technical problems involved in the continuous measurement of the velocity at many points, it is necessary to take into account the errors caused by the non-uniformity of the velocity field in the channel with the variable cross section and the effect of averaging currents produced by different voltages between electrodes along the channel. Thus, it was found necessary to find convenient and feasible methods of obtaining continuous information on the magnitude of the induced electromotive force and the respective electrical load factor. Since to achieve the above object of the invention it was required to ensure that the effective mode of the MHD-generator should be maintained, the value of the MHD-generator total power, which is the most important parameter of the latter, has been assumed to serve as the principal control criterion which ensures that the electrical load factor becomes stable.

Since the maximum power delivered by an MHD-generator is obtained when the electrical load factor in all electrodes is $\nu_e = 0.5$, it has been found possible to use the derivative of the total power of the MHD-generator to continuously monitor the value of the electromotive force induced in the plasma flow between the electrodes.

Thus, to achieve the object of the invention the problem as stated above has been solved by the provision of a method for controlling the performance of D.C. MHD-generator by varying the voltages across the electrodes of the latter which, according to the invention, consists in that the required value of the MHD-generator electrical load factor is preset, control signals to periodically vary voltages across said electrodes in a discrete manner are shaped, the change of the MHD-generator active power is found for every time interval equal to the period of the discrete voltage variations across the electrodes and then according to the change of the active power within said time interval, a control signal is generated to vary voltages across the electrodes of the MHD-generator so as to maintain the preset electrical load factor.

In the specific and preferred embodiment of the invention, as related to the method of controlling the performance of a D.C. MHD-generator coupled with an A.C. mains, control signals to periodically vary voltages across the electrodes of the MHD-generator in a discrete manner are shaped at a frequency which is twice as low as that of the A.C. mains, while the change of the active power during every time interval equal to two cycles of the A.C. mains voltage is determined by means of converting the integral of the active power within the cycle of the A.C. mains voltage into a power pulse proportional to this integral and equal to the difference between two successive pulses following each other and constituting a pair.

In the specific and preferred embodiment of the invention it is also expedient that the controller for adjusting the performance of a D.C. MHD-generator coupled with an A.C. mains via a controllable converter and provided with a means for adjusting voltages across the electrodes of the MHD-generator should, according to the invention, contain a unit for shaping control signals to periodically vary voltages across the electrodes of the MHD-generator in a discrete manner, the output of the unit being coupled with the control input of said converter; an active power sensor facing said A.C. mains; a unit for the periodic and proportional converting of active power integrals into power pulses the input of which is coupled with the output of said active power sensor; a unit for determining the difference between two successive power pulses the input of which is coupled with the output of said unit for the periodic and proportional converting of active power integrals into power pulses, while the output of which is coupled with the input of said unit for shaping control signals to periodically vary voltages across the electrodes of the MHD-generator in a discrete manner.

The unit for shaping control signals to periodically vary voltages across the electrodes of the MHD-generator in a discrete manner in said controller of the performance of the D.C. MHD-generator can also be designed as a switch using two thyristors and a switching capacitor which produces output signals, the input signals being fed to the control electrodes of the thyristors.

The unit for the periodic and proportional converting of active power integrals into power pulses in said controller of the performance of the D.C. MHD-generator can also be built around a transistor operating in the key mode which is connected in-series with a linear choke and contains a train of a capacitor and a diode connected in series, the train being inserted between the emitter and the collector of said transistor.

The unit for determining the difference between two successive power pulses in said controller for adjusting the performance of a D.C. MHD-generator can also be arranged around two capacitors serving to average said power pulses; a transistor forming a discharge loop with one of the capacitors of the diode which, together with said transistor, forms the discharge circuit of the second capacitor; and another transistor serving to charge the second capacitor.

The proposed method of controlling the performance of a D.C. MHD-generator in conjunction with the respective units makes it possible, under other equal conditions, to raise the level of the electric power produced by the MHD-generator.

Other methods of controlling the electrical performance of a MHD-generator used nowadays, such as those mentioned above, which involve the maintenance of the current or the electrode voltage at the preset level fail to ensure the required electrical load factor or the maximum value of electric power under the conditions of plasma parameter variations in the channel which cannot be avoided in the course of the MHD-generator operation.

The proposed apparatus makes it possible to continuously take into account the effect produced by plasma parameter variations in the MHD-generator on the power performance of the latter, whereas the devices known in the prior art, though capable of measuring the current and the voltage, cannot respond directly to the variations of the electrical power produced by the MHD-generator. In the proposed apparatus the major effect is obtained by means of directly determining the relative power variations which follow the preset variations of voltages across the electrodes before the optimum required value of the electrical load factor is achieved.

In fact, the proposed method and the respective apparatus make it possible to obtain the electrical load factor of an MHD-generator which is required according to the design project.

As shown experimentally, the increase of the electric power obtained due to the use of the proposed apparatus in an MHD-generator can be as high as 40-50 percent depending upon the range of possible variations of plasma parameters.

A detailed description will now be given of the proposed method for controlling the performance of a D.C.MHD-generator as well as of an embodiment of the apparatus for carrying said method into effect, with reference to the accompanying drawings, wherein:

FIG. 1 shows a simplified block diagram of a D.C. MHD-generator whose performance is controlled by means of the method, according to the invention;

FIG. 2 presents the power and the voltage-current characteristics of the MHD-generator;

Figure 7:
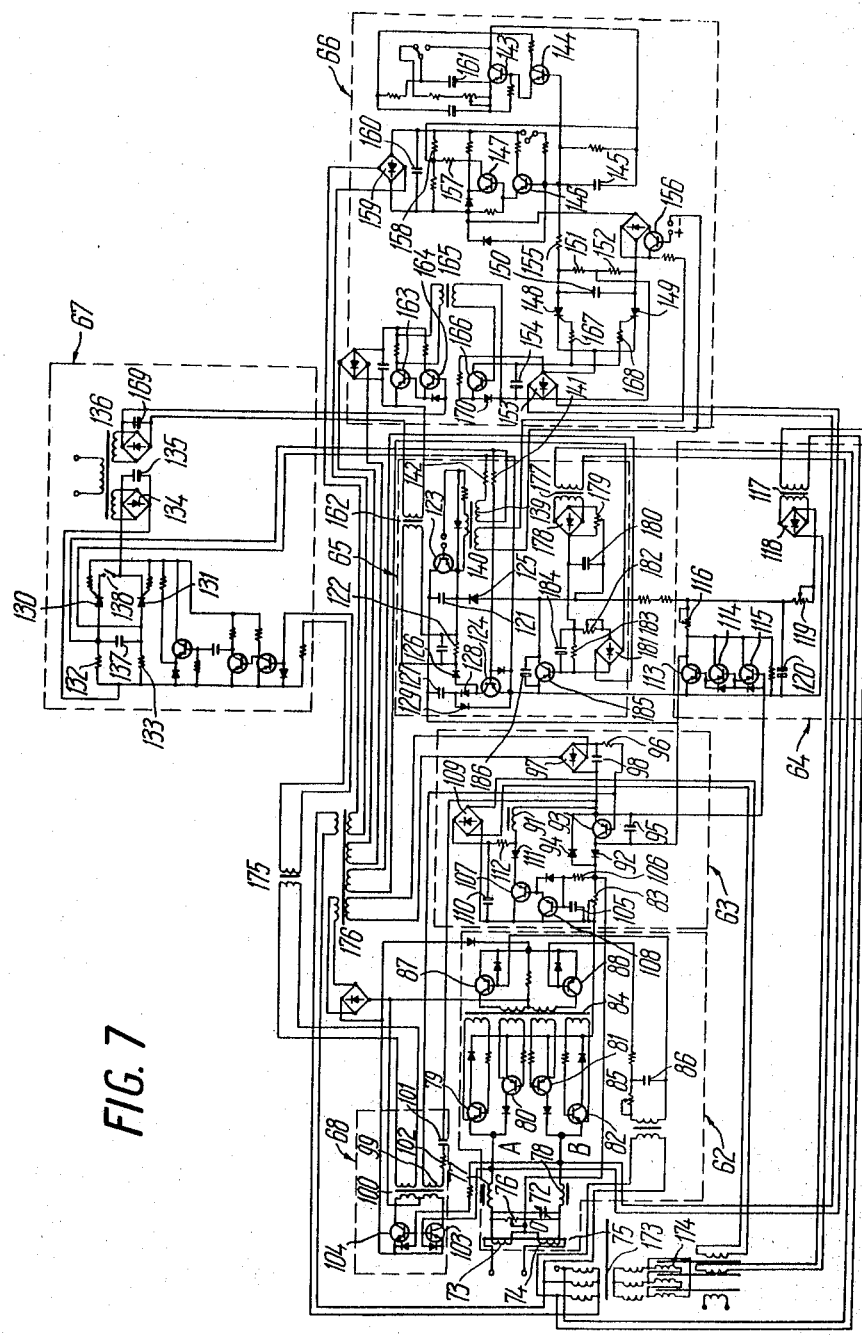
Figure 8:
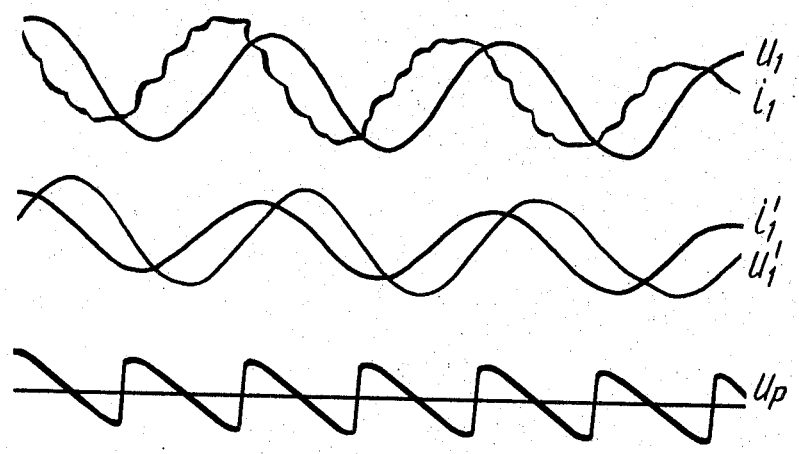
Figure 12:
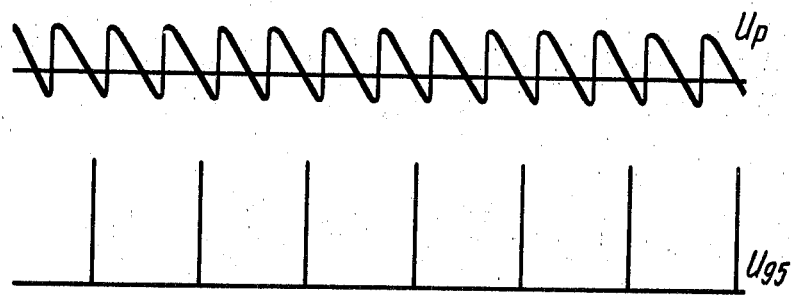
Figure 10:
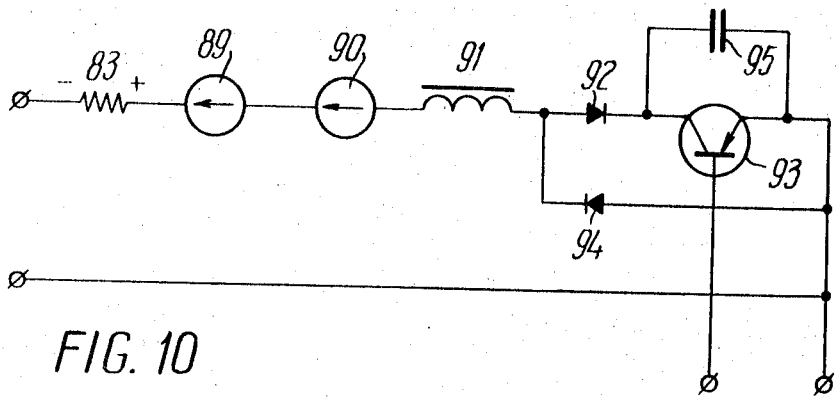
Figure 11:
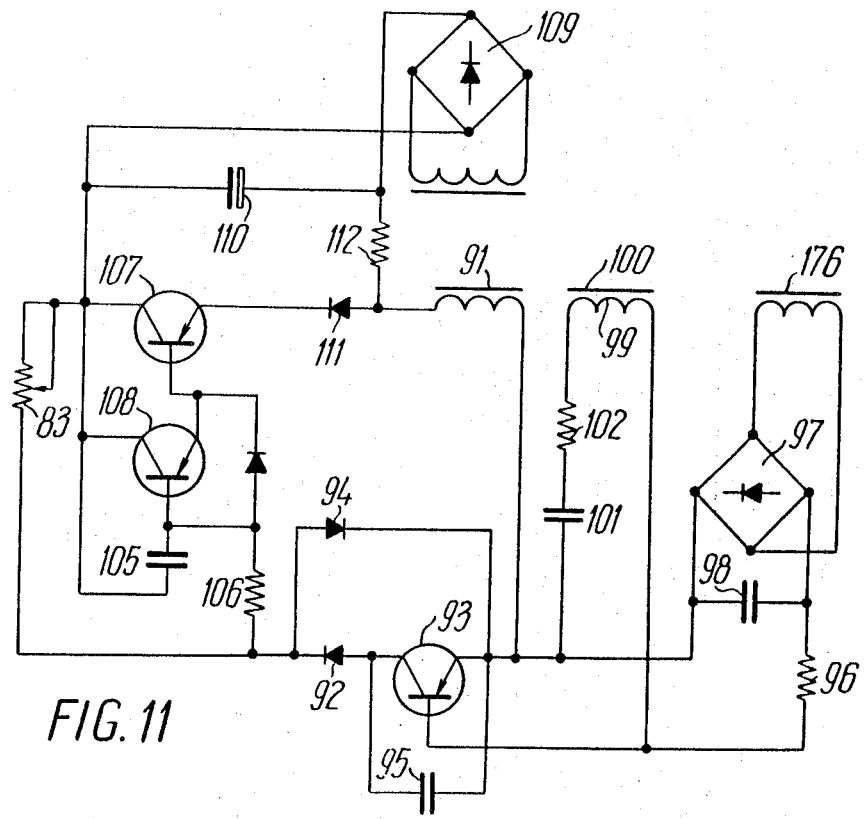
Figure 13:
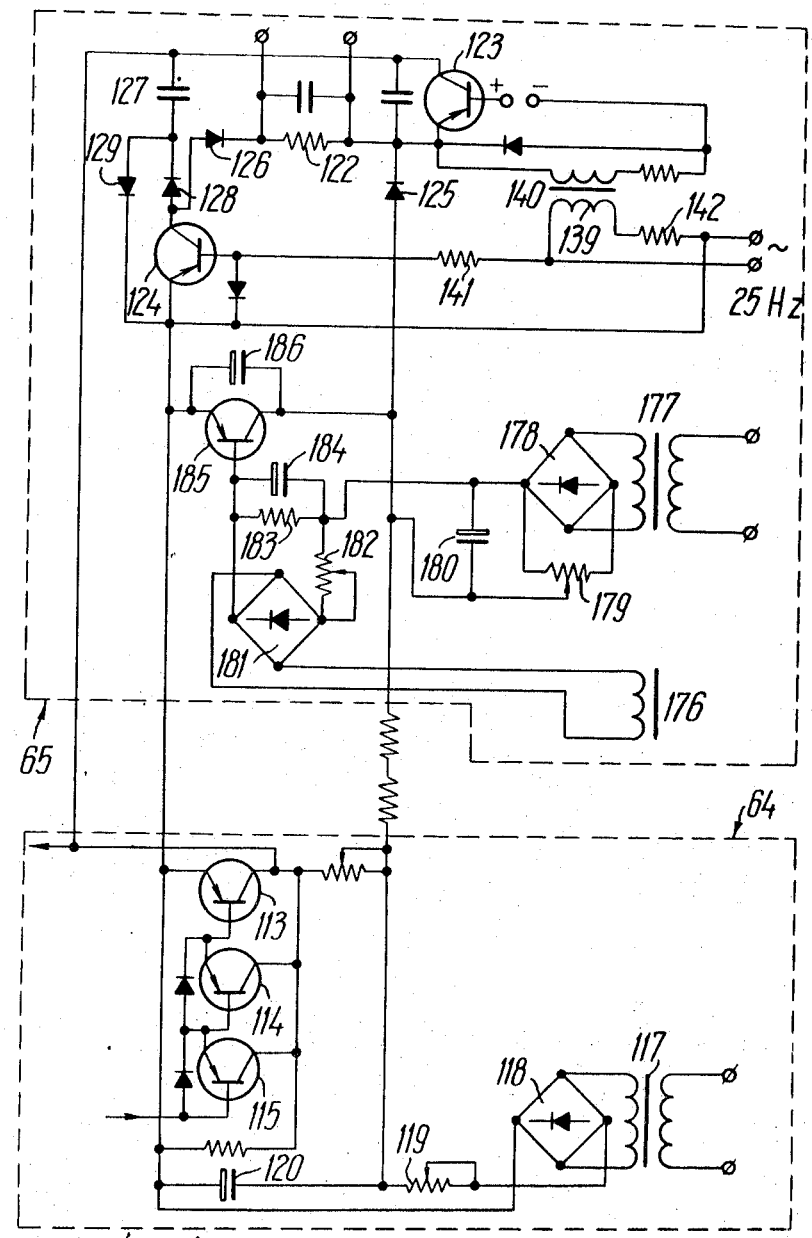
Figure 14:
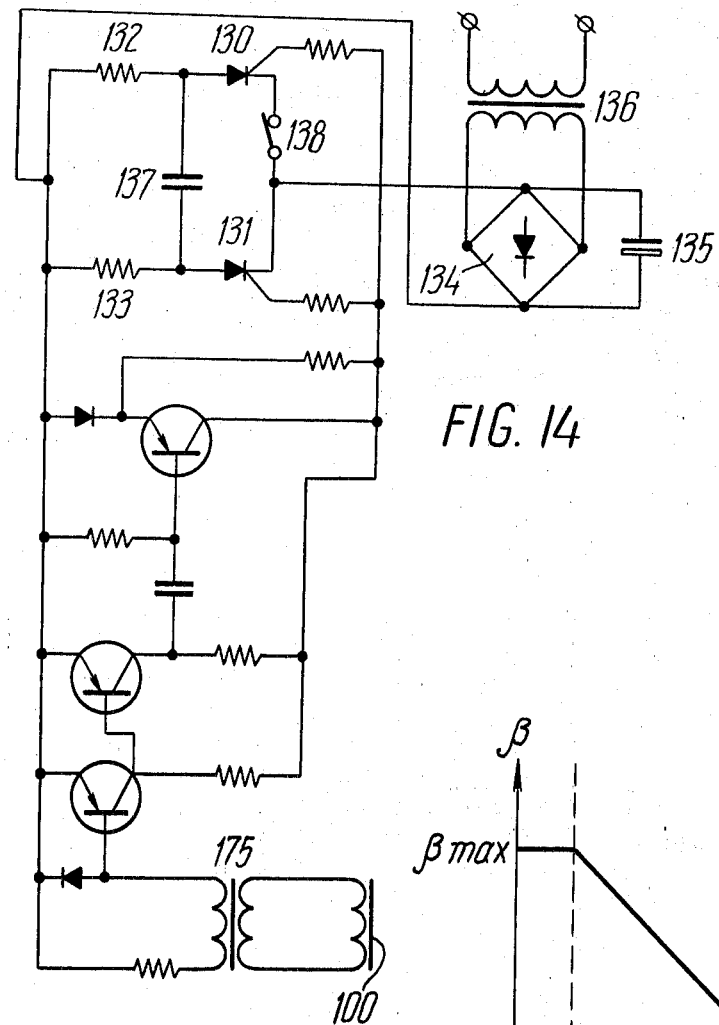
Figure 17:
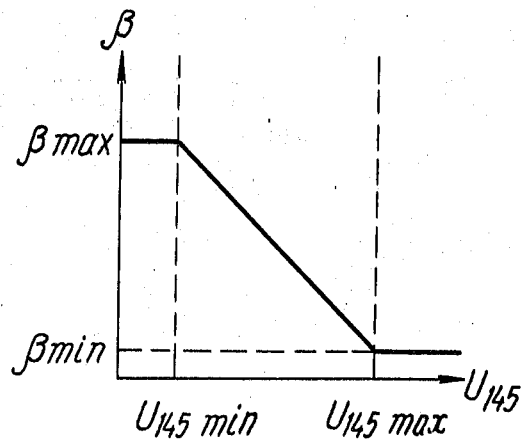
Figure 15:
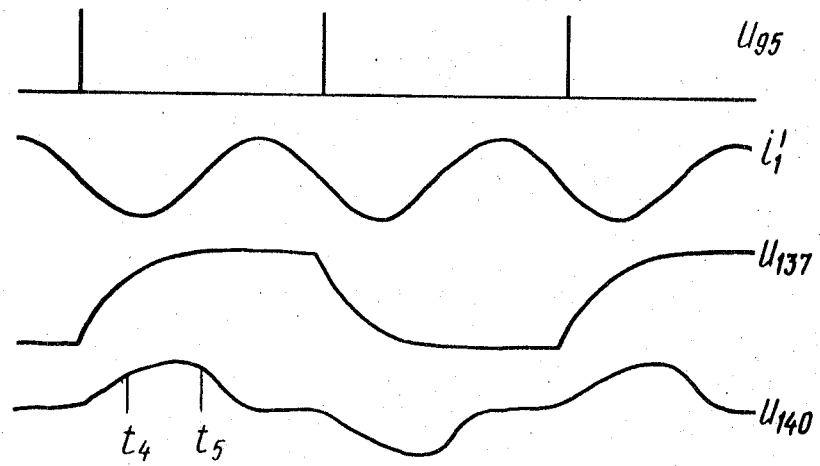
Figure 18:
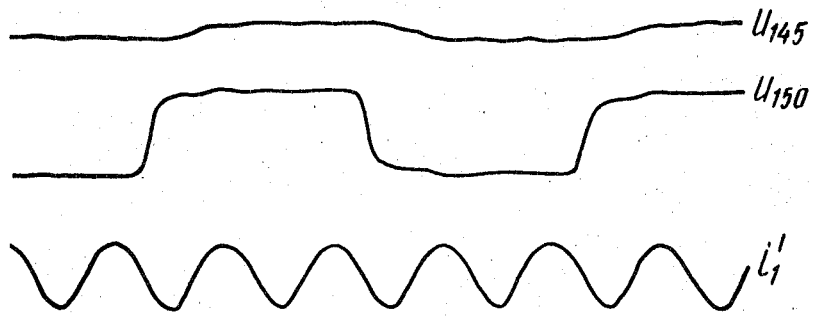
Figure 16:
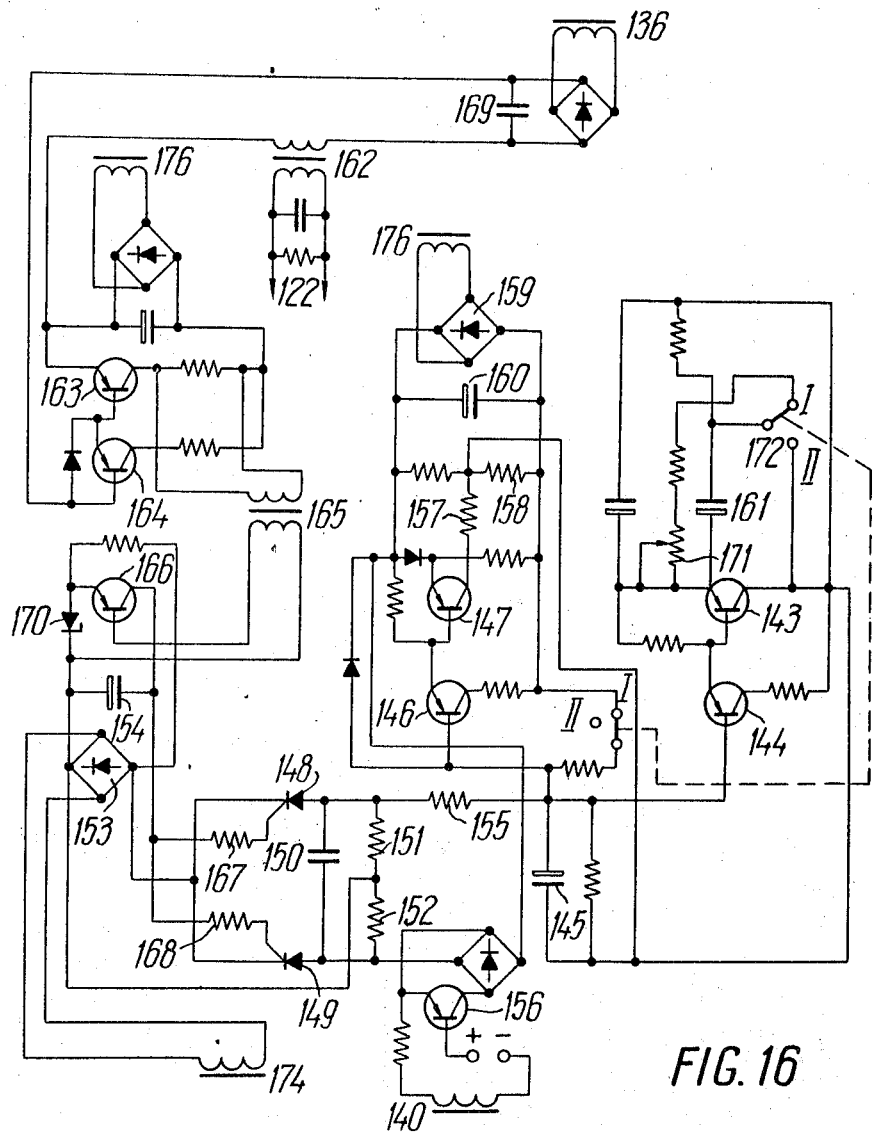
Figure 19:
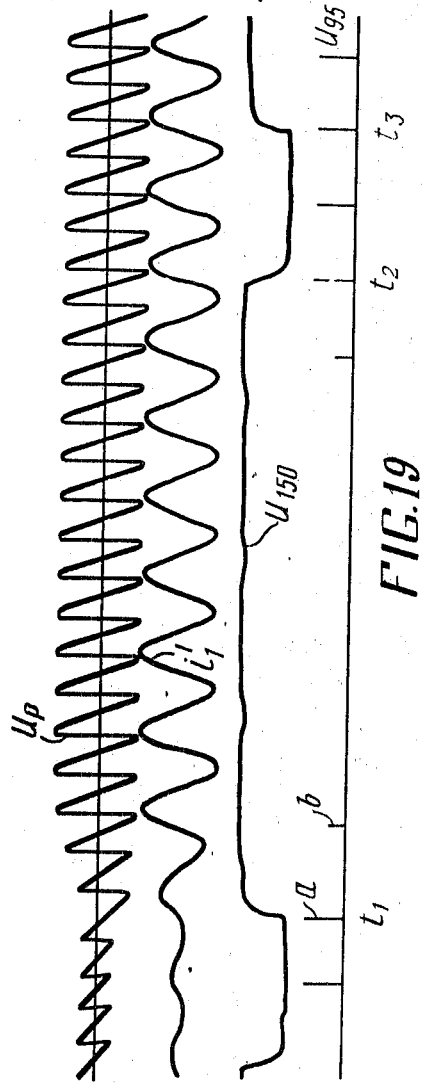
Figure 20:
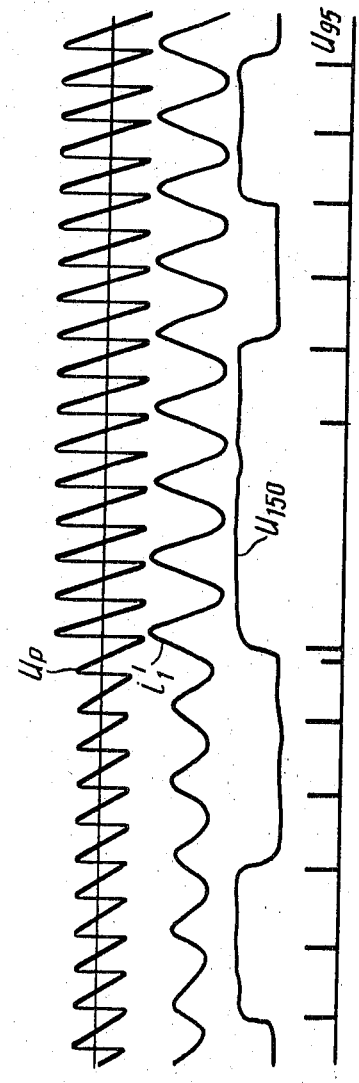
Figure 22:
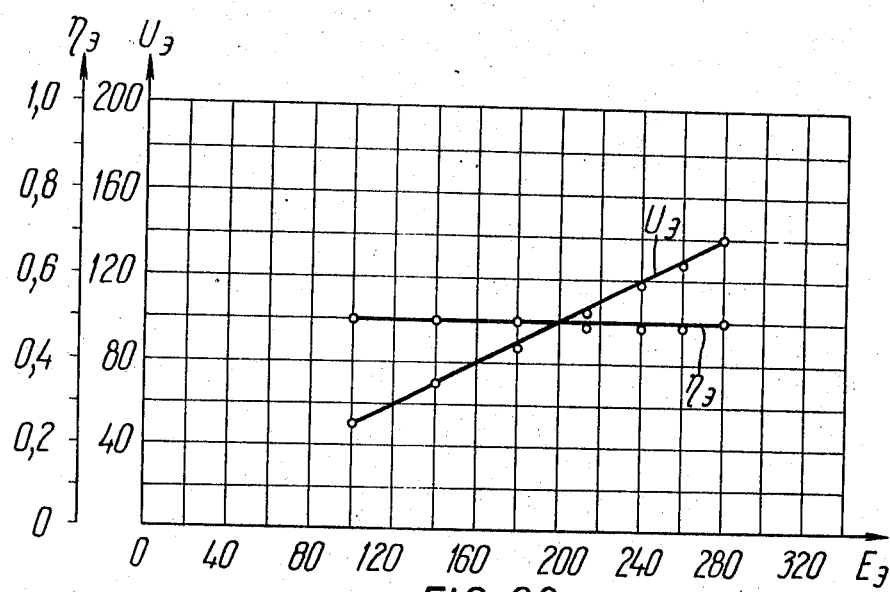
Figure 23:
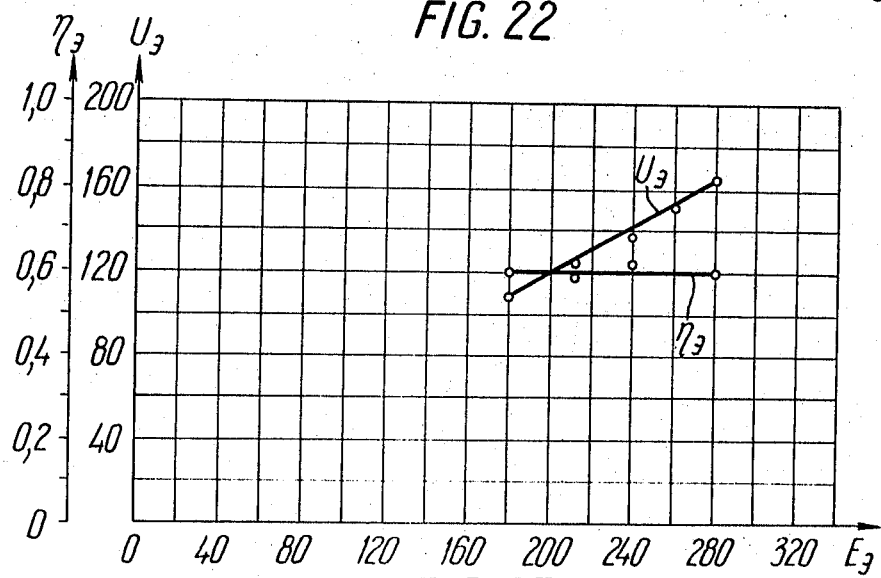
Figure 24:
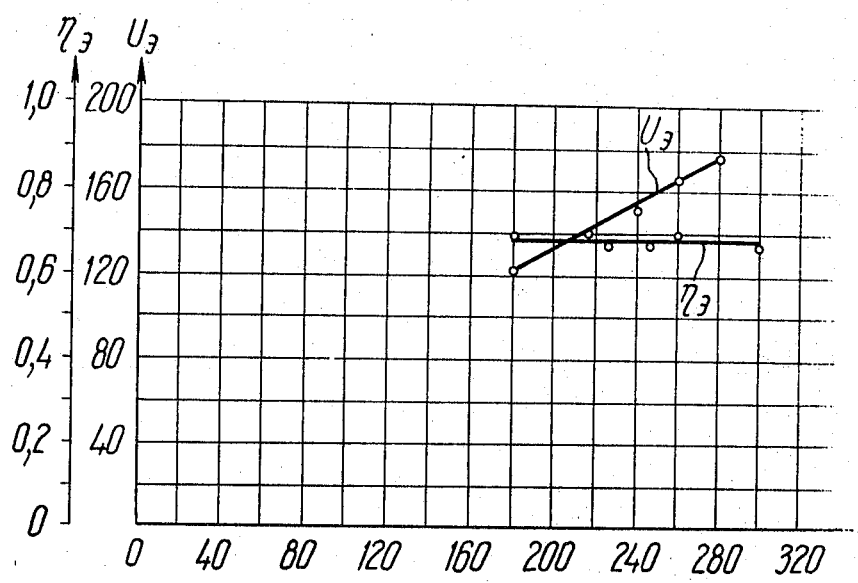
Figure 25:
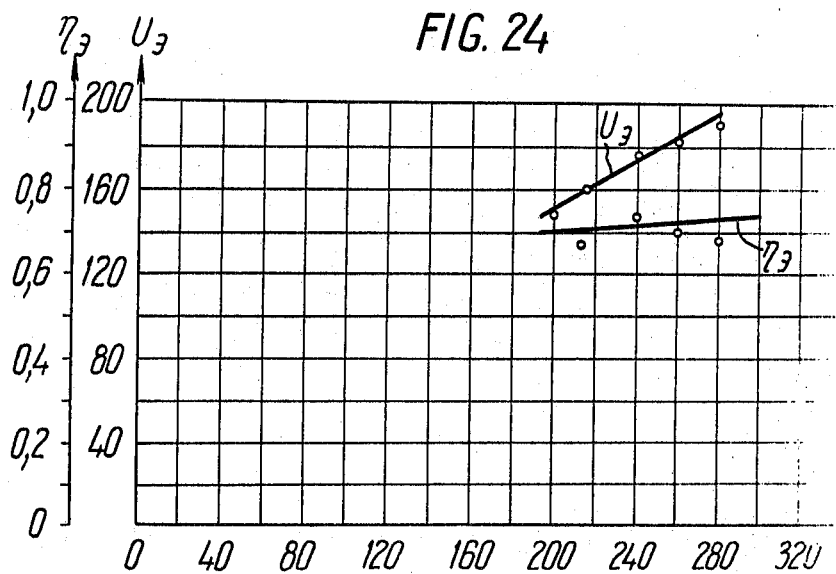

FIG. 5 presents curves characterizing voltages and currents at the input and at the output of the active power sensor;

FIG. 6 is a complete block diagram of the apparatus for controlling the performance of the D.C. MHD-generator coupled with the A.C. mains via the converter;

FIG. 7 presents a complete circuit diagram of the apparatus for controlling the performance of the D.C. MHD-generator coupled with the A.C. mains via the converter;

FIG. 8 shows oscillograms of currents and voltages of the power sensor;

FIG. 9 shows the relationship between the average voltage at the output of the active power sensor and the active power on the side of the primary of the multiple-winding transformer;

FIG. 10 is a diagram illustrating the operation of the unit for the periodic and proportional converting of active power integrals into power pulses;

FIG. 11 presents a circuit diagram of the unit for the periodic and proportional converting of active power integrals into power pulses;

FIG. 12 shows oscillograms of signals at the input and at the output of the unit for the periodic and proportional converting of active power integrals into power pulses;

FIG. 13 is a diagram of the power pulse follower/amplifier and of the unit for determining the difference between two successive power pulses;

FIG. 14 presents a circuit diagram of the 25-Hz voltage generator;

FIG. 15 shows oscillograms illustrating the operation of units 62, 63, 67 and 69;

FIG. 16 is a diagram of the unit for shaping control signals to periodically vary voltages across the electrodes of the MHD-generator in a discrete manner;

FIG. 17 shows the relationship between the thyristor ignition angle and the output voltage of the unit for shaping control signals to periodically vary voltages across the electrodes of the MHD-generator in a discrete manner;

FIG.18 presents oscillograms of voltages and currents of the unit for shaping control signals to periodically vary voltages across the electrodes of the MHD-generator in a discrete manner;

FIGS.19 and 26 show oscillograms of voltages and currents occurring at the moment the proposed apparatus is switched on for operation;

FIG.20 presents oscillograms of currents and voltages occurring at the moment the conductivity of the plasma in the MHD-generator channel becomes twice as high;

FIG.21 presents oscillograms of currents and voltages occurring at the moment the conductivity of the plasma in the MHD-generator channel becomes twice as low; and FIGS. 22, 23, 25 and 26 present static characteristics of the proposed apparatus for maintaining the electrical load factor at the required level.

A better understanding of the essence of the proposed method could be secured from the following description of the simplified block diagram of a D.C. MHD-generator 1 (FIG.1) operating into a load 2 and having; a means 3 to adjust voltages across electrodes 4, a unit 5 for shaping control signals to periodically vary voltages across the electrodes 4 in a discrete manner; an active power sensor 6; a unit 7 for sensing variations of the MHD-generator active power within every time interval equal to the period of the discret voltage variation at the electrodes 4.

Figure 2:
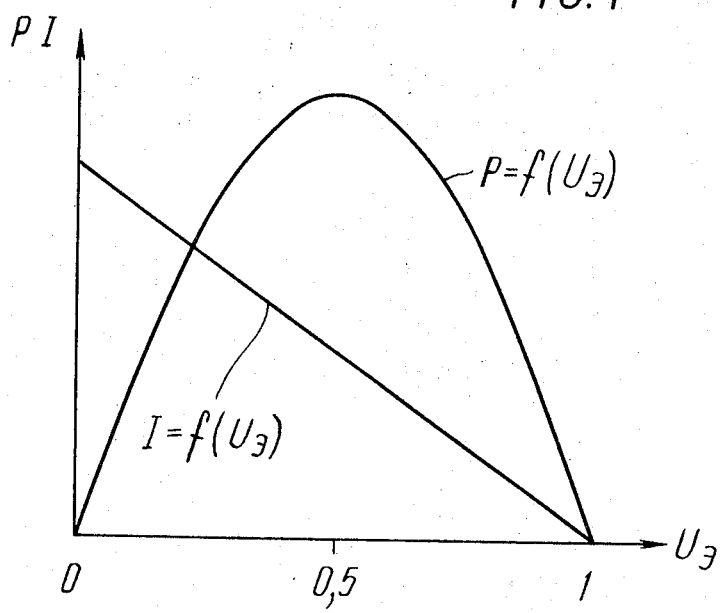

If the voltage across the electrodes 4 is quickly changed by $\Delta U_e$ by affecting the means 3 in the respective way, there should occur a certain increment $\Delta P$ of the power which can be either positive or negative, or zero. It is evident from FIG.2 that when the MHD-generator has a current-voltage characteristic of the simplest kind which corresponds to a linear current-voltage characteristic of the electrodes with the power maximum at $\nu_e = 0.5$, since for $U_e > 0.5$ the value of $\nu_e$ is proportional to $U_e$, we shall have $\Delta P/\Delta U_e > 0$, while for $U_e > 0.5$ we shall have $\Delta P/\Delta U_e > 0.5$. Hence, in the course of controlling the performance of an MHD-generator the relative value of $\Delta P/\Delta U_e$ represents a very precise criterion for assessing the electrical load factor.

It must be borne in mind that actual current-voltage characteristics can differ from linear ones considerably due to a number of reasons, and in this case $\Delta P/\Delta U_e = 0$ at $U_e = 0.5$, which will allow the point on the power characteristic $P = f(U_e)$ to be used as the initial one for measuring the electrical load factor.

Assuming that the primary principle of control is the search of the position when $\Delta P/\Delta U_e = 0$ it must be borne in mind that this method of adjustment will be useful, first of all, for automatically driving the MHD-generator to perform with the maximum power even in case there are certain errors in maintaining the required distribution of voltages between electrodes along the channel of the MHD-generator having sectionalized electrodes.

The effect of these errors will consist in that there may occur certain deviations mainly at the beginning and at the end of the channel when the average electrical load factor along the MHD-generator channel is 0.5.

However, near the maximum of the power characteristic $P = f(U_e)$ even considerable variations of the electrical load factor will produce a rather slight effect on the active power of the MHD-generator. Thus, with $\nu_e = 0.55$ or $\nu_e = 0.45$ the power level will get down by only 1 percent in comparison with its level at $\nu_e = 0.5$, while with $\nu_e = 0.6$ or $\nu_e = 0.4$ the power drop will be only 4 percent when compared with the level obtained at $\nu_e = 0.5$.

When checked experimentally, the proposed method of control proved that at $\Delta P/\Delta U_e = 0$ the accuracy achieved in the course of calculations should allow the required value of the electrical load factor to be maintained within the range of $0.5 \pm 0.005$, including the case when it is 0.5, which produces a reduction of power throughout the MHD-generator channel of less than 1 percent.

Figure 1:
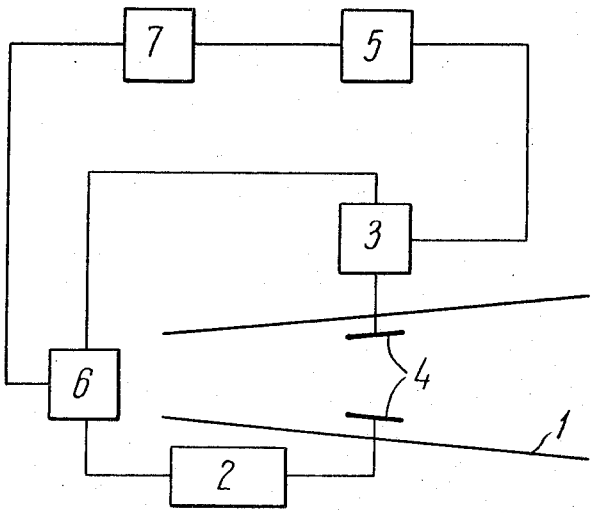

The above considerations make it easy to understand how the performance of the MHD-generator shown in FIG.1 is controlled.

Until the increment $\Delta U_e$ of the voltage across the electrodes 4 caused by the operation of the unit 5 continues producing the increment $\Delta P$ of the power of the MHD-generator 1 within the corresponding time interval equal to the cycle of discrete variations of the voltages across the electrodes 4, i.e., until the increment $\Delta P$ as determined by the unit 7 is positive, the unit 5 will affect the means 3 for adjusting voltages across the electrodes 4 so as to increase the power P.

As soon as the increment $\Delta U_e$ of voltages across the electrodes 4 causes a power reduction, i.e., as soon as the value $\Delta P$ as measured within the corresponding time interval becomes negative, the unit 5 will start affecting the means 3 for adjusting voltages across the electrodes so as to increase the power again due to the change of the sign of the voltage increment $\Delta U_e$.

Thus, the procedure of controlling the performance of the MHD-generator shown in FIG.1 ensures that the required value of the electrical load factor is maintained at the calculated optimum level of $\nu_e = 0.5$.

The proposed method allows the value of the required electrical load factor to be maintained at any level different from 0.5 the optimum.

To this end the apparatus realizing the proposed method of control should contain a certain mismatch at which the power of the MHD-generator would be measured with an error known a priori. If this measured power is $P_m$ and the power increment is $\Delta P_m$, the control procedure will maintain the required electrical load factor $\nu_{ereq} = \Delta P_m/\Delta U_e$ which would differ from $\nu_e = 0.5$.

Consider the proposed method as applied to the MHD-generator 8 (FIG.3) provided with sectionalized electrodes $9_1 - 9_{42}$ and connected, via gate converters $10_1 - 10_{42}$ using thyristors and via a multiple winding transformer 11 having secondary windings $12_1 - 12_{42}$ and a primary winding 13, to a three-phase electrical mains 14.

The performance of this MHD-generator, according to the proposed method, is controlled with the help of an active sensor 15; a unit 16 for shaping control signals to periodically vary voltages across the electrodes $9_1 - 9_{42}$ in a discrete manner the output of which is connected to control electrodes $17_1 - 17_{42}$ of the thyristors; a unit 18 for the periodic and proportional converting of active power integrals into power pulses the input of which is connected to the output of the sensor 15; a unit 19 for determining the difference between two successive power pulses the input of which is connected to the output of the unit 18 and the output of which is connected to the input of the unit 16.

Consider the process of controlling the performance of this MHD-generator.

The direct current flowing through the electrodes $9_1 - 9_{42}$ of the MHD-generator is converted into an alternating current by the gate converters $10_1 - 10_{42}$ using thyristors. The alternating current is fed to the secondaries $12_1-12_{42}$ of the multiple-winding transformer 11 the primary 13 of which is connected to the electrical mains 14. A signal proportional to the active power from the sensor 15 is applied to the input of the unit 18 which integrates the power value during one cycle of the A.C. mains voltage so as at the end of every cycle it produces a power pulse proportional to this integral. The unit 18 is designed so that the difference between the amplitudes of the two successive power pulses is proportional to the difference between the values of active power passing via the multiple-winding transformer 11 within the two successive cycles of the A.C. mains voltage.

The signal proportional to this difference between the amplitudes of the two successive power pulses is shaped at the output of the unit 19 to be fed to the input of the unit 16.

In the course of operation small discrete variations of voltages across the electrodes $9_1 - 9_{42}$ occur continuously between the cycles of the A.C. mains voltage. In other words there is always either a positive or a negative increment $\Delta U_e$ of the voltage across these electrodes caused by corresponding slight variations $\Delta \beta$ of the values of the ingnition angle $\beta$ characteristic of the thyristors used in the gate converters $10_1 - 10_{42}$.

Voltages across the electrodes $9_1 - 9_{42}$ will change at the moments when the current flowing through the primary 13 of the multiple-winding transformer 11 crosses the zero line passing from a negative to a positive value.

The sign of the electrode voltage increment will change in case the power within the second cycle drops below the value observed during the first cycle, i.e., the change of the voltage is an unfavorable phenomenon from the point of view of approaching the required value of the electrical load factor corresponding to the optimum of the power characteristic $P=f(U_e)$.

As long as the power increments are positive there will be no change in the sign of the voltage increment at the electrodes and successive increments $\Delta U_e$ of voltages across the electrodes will result in the shift of the operation point towards the maximum of the power characteristic.

When the operation point reaches the area of the maximum of the power characteristic the performance of the MHD-generator becomes quasi-stable, i.e., the sign of the electrode voltage increments $\Delta U_e$ starts alternating incessantly with every two cycles of the A.C. mains voltage, but due to the fact that the positive and negative voltage increments $\Delta U_e$, which follow one another and constitute about 2.5 percent of the total value, are equal, the voltages across the electrodes remain practically unchanged having a 25-Hz component at the A.C. voltage whose amplitude is only 1.25 percent of the average value. These voltage fluctuations cause power variations at the frequency of 25 Hz with amplitudes of only $1.5 \times 10^{-4}$ of the average value.

The detailed description of the essence of the proposed method of controlling the performance of a D.C. MHD-generator will now be followed with considerations regarding devices to realize this method beginning with the simplest one designed in accordance with the simplified diagram of FIG.4 which corresponds to the D.C. MHD-generator coupled with the A.C. mains via gate converters and shown in the form of a simplified block diagram in FIG. 3.

An active power sensor 15 is connected so as to face the A.C. mains. It contains a current transformer 20 the primary 21 of which carries an alternating sine current to be measured. The instant values $i_1$ of this current are determined through the amplitude values $I_{lm}$, the circular frequency $\omega$ and the time $t$ according to the formula.

$$i_1 = I_{lm} \sin wt \tag{3}$$

The active power sensor 15 is provided also with a voltage transformer 22 the primary 23 of which is fed with the sine voltage to be measured. The instant value $u_1$ of this voltage at every time moment $t$ is determined through the amplitude value $U_{lm}$, the circular frequency $\omega$ and the phase angle $\phi$ according to the formula:

$$u_1 = U_{1m} \sin (wt - \phi) \tag{4}$$

Connected to two similar secondaries 24 and 25 of the current transformer arranged in a circuit with a zero point via transistors 26, 27, 28 and 29 is a load resistor 30 producing a voltage drop which is proportional to the active power due to the fact that the transistors are controlled by a voltage arriving from the voltage transformer.

The voltage transformer 22 has four secondaries 31, 32, 33 and 34 which are coupled with the emitter-base junctions of the transistors 26, 27, 28 and 29 via resistors 35, 36, 37, and 38. In case the phases of voltages across the windings of the transformers 20 and 22 are properly adjusted the resistor 30 will produce a voltage $u_p$ the shape of which together with those for the current $i_1$ and the voltage $u_1$ are shown in FIG.5. The average value of the voltage across the resistor 30 is $$U_p = \frac{2}{T}\int_0^{\pi/2} U_p dt = I_1 \cos \phi \tag{5}$$

where $I_1 = I_{lm}/\sqrt{2}$.

In other words for the given voltage value it corresponds to the active power $$P_1 = \frac{2}{T}\int_0^{\pi/2} u_1 i_1 dt = I_1 U_1 \cos \phi \tag{6}$$

The case shown in FIG.5 when the current leads the voltage corresponds to the standard inversion mode of operation (D.C. to A.C. conversion) with reactive power consumption. The mode of operation of the transistors 26, 27, 28 and 29 (FIG.4) depends upon the values of the current $i_1$ (FIG.5) and the voltage $u_1$ within the cycle of the current $i_1$ and corresponds to intervals I, II, III and IV shown in FIG. 5.

During interval I when the current is positive and the voltage is negative the transistor 28 conducts since positive voltages are applied to its emitter-collector and emitter-base junctions. The other transistors are cut-off, for in case of a positive emitter-collector voltage the transistor 26 has a backward voltage at its emitter-base junction while the transistors 27 and 29 have backward voltages in their collector circuits which are blocked by diodes 41 and 42.

The transistor 28 is arranged in the circuit so that during the time interval when the voltage $u_1$ and the current $i_1$ have opposite directions the voltage across the resistor 30 will be negative. During the subsequent interval II when the voltage $u_1$ and the current $i_1$ have similar directions the voltage across the resistor 30 will be positive.

The events take place due to the fact that during interval II the transistor 26 conducts, having positive voltages at its emitter-collector and emitter-base junctions while the other transistors are cut-off since with the positive emitter-collector voltage the transistor 28 a has a backward voltage at its emitter-base junction while the transistors 27 and 29 have backward voltage in their collector circuits which are blocked by the diodes 41 and 42. During the negative half-cycle of the current within intervals III and IV the transistors 27 and 29 conduct and the voltages across the resistor 30 become equal during the positive and the negative half-cycles of the current.

The unit 18 (FIGS. 3 and 4) for the periodic and proportional converting of active power integrals into power pulses has its input coupled with the output of the active power sensor 15 (the resistor 30), the average voltage $U_p$ across the latter being proportional to the active power on the primary side of the multiple-winding transformer 11. The unit 18 comprises a D.C. voltage $U_o$ supply 43, a linear choke 44 and a transistor 45 which has its emitter-collector junction connected, via a diode 46, to a capacitor 47. Kept at saturation during the whole period of the cycle of the current $i_1$ the transistor 45 at the moment when the positive-going current $i_1$ crosses the zero level, is driven to cut-off by a short pulse of the voltage $u_2$ applied in the backward direction to the emitter-base junction. At the same time the capacitor 47 is charged up to the voltage $$U_{47} = \sqrt{L \cdot i_{ch}/c} \qquad (7)$$

where $i_{ch}$ is the current flowing through the choke 44 at the moment the transistor 45 is cut-off, L is the inductance of the choke 44, C is the capacitance of the capacitor 47.

This equation follows from the fact that when the current flowing through the choke 44 drops to zero, the total amount of energy $Li/2$ stored in it will be transferred to the capacitor 47. The parameters of the circuit should be selected so that the drop to zero of the current in the choke 44 and the charging of the capacitor 47 will be over within a time interval much shorter than half a cycle.

Normal operation of subsequent elements of the controller being discussed used to adjust the performance of an MHD-generator is ensured by means of an inverted conversion of the active power integral into a pulse power which consists in that an increase of the active power integral corresponds to a decrease of the pulse power at the capacitor 47, while a decrease of the active power integral corresponds to an increase of the pulse power at the capacitor 47. To this end the source 43 of D.C. voltage $U_o$ is connected in series to the resistor 30 so that the voltage $U_o$ is opposite to the voltage drop $u_p$ across the resistor 30. The current to flow through the choke 44 within every cycle of its operation between the intervals when the transistor 45 is driven to cut-off, is formed under the effect of the voltages $u_p$ and $U_o$, the value of $U_o$ being selected so as to exceed the maximum value of $u_p$. Since at the beginning of every cycle the current flowing through the choke 44 is equal to zero the value of the current $i_{ch\ max}$ by the end of the cycle will be determined by the relation $$i_{ch\ max} = \frac{1}{L}\int_0^T (U_0 - u_p)\,dt \qquad (8)$$

The reverse dependence of the power pulse amplitude increment on the value of the average voltage $U_p$ within a cycle will correspond to this relation according to which an increase of the $$\int_0^T u_p\,dt$$

will be accompanied by a decrease of the total voltage affecting the choke 44.

The unit 19 for determining the difference between two successive power pulses, the input of which is coupled with a capacitor 47 serving as the output of the unit for the periodic and proportional converting of active power integrals into power pulses, comprises comparison capacitors 48 and 49, a load resistor 50 and auxiliary circuits using transistors 51 and 52 and a diode 53. The first power pulse charges the capacitor 48 which, during the time interval between the first and the second power pulses, serves as a memory element. Then, the voltage across said capacitor is compared with the second pulse power to be followed by the discharge of the capacitor 48. If the amplitude of the second power pulse exceeds that of the first pulse, i.e., if the active power as measured by the active power sensor during the second voltage cycle within the double-cycle period of the controller operation has become less than that during the first cycle, the difference between the amplitudes of the power pulses will be detected at the resistor 50.

Figure 4:
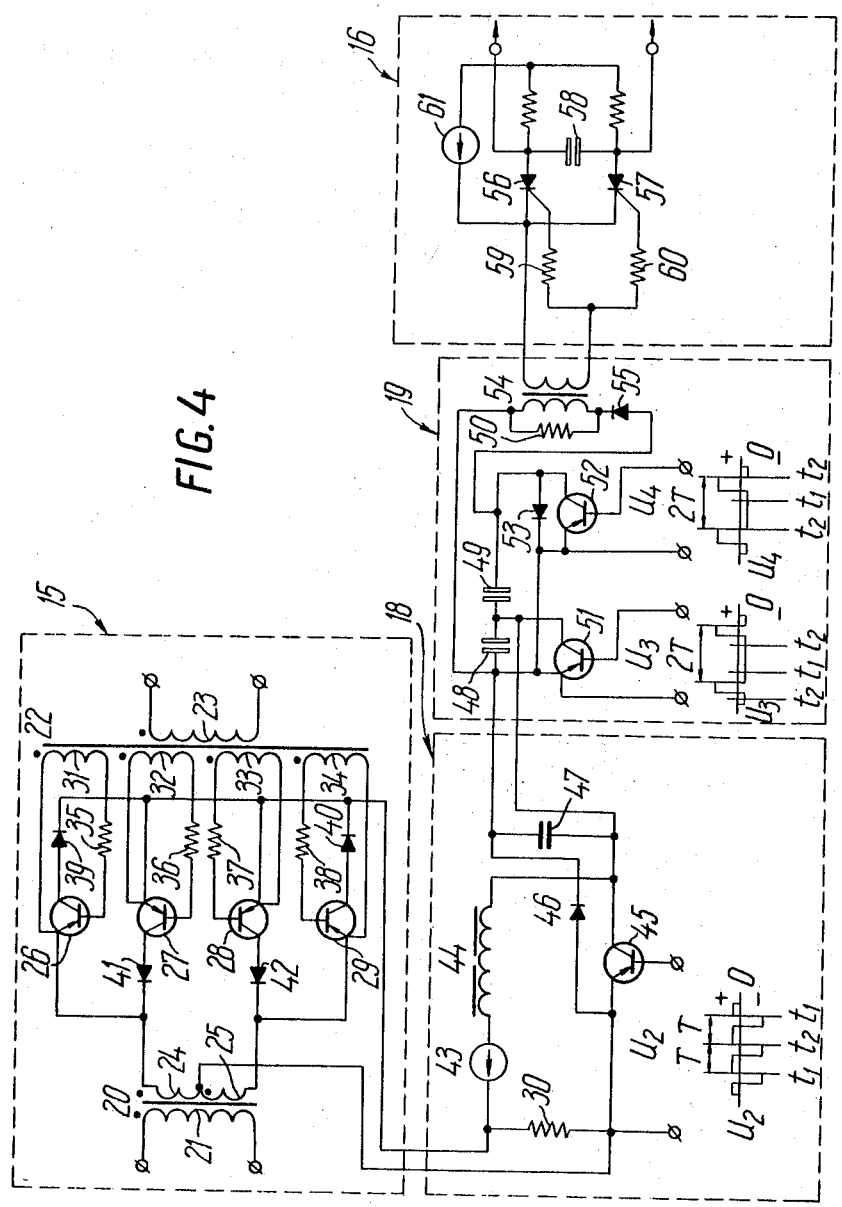
FIG. 4 shows a circuit diagram of the apparatus for controlling the performance of the D.C. MHD-generator coupled with the A.C. mains via a converter.

The successive charge-discharge mode of the capacitor 48 is effected through the transistors 51 and 52. The output load of the unit for the periodic and proportional converting of active power integrals into power pulses is balanced during the first and the second power pulses with the help of the capacitor 49 whose rating is equal to that of the capacitor 48. During the time interval when the first power pulse passes through the circuit the transistors 51 and 52 will be cut-off as indicated in FIG. 4 by the curves of the control signals $u_3$ and $u_4$ applied to the emitter-base junctions of said transistors. Thanks to this arrangement it is only the capacitor 48 that gets charged up to the amplitude of the first power pulse. When the second power pulse passes through the circuit the transistor 52 will start conducting, and the capacitor 49 gets charged up the amplitude of the second power pulse. In case the amplitude of the second power pulse exceeds that of the first pulse the corresponding difference will be detected across the resistor 50 to be passed to the next unit 15 via a transformer 54. A diode 55 serves to ensure that the next unit receives pulses of only one polarity as required. When the second power pulse is over the capacitor 49 gets discharged through a diode 53. Then follows the discharge of the capacitor 48 which is effected by the transistor 51 due to an unblocking pulse appearing at the emitter-base junction of this transistor at the respective moment as shown in the diagram of FIG.4.

The unit 16 for shaping control signals to periodically vary voltages across electrodes of the MHD-generator in a discrete manner, the input of which is coupled, via the transformer 54, with the output of the unit 16 for determining the difference between two successive pulses obtained at the resistor 50, comprises thyristors 56 and 57 the anodes of which are connected to a switching capacitor 58; resistors 59 and 60 serving to pass control pulses from the transformer 54 to the control electrodes of the thyristors, and a D.C. power supply 61. A change of the voltage sign at the switching capacitor 58 affects the control electrodes of the thyristors in the gate converters and reverses the sign of the increment $\Delta\beta$ of the ignition angle $\beta$ which is directly converted by the gate converters into small discrete variations of voltages across the electrodes of the D.C. MHD-generator.

The sense of operation of all elements in the system is selected so that a reduction of the active power during the second cycle in comparison with the first cycle would change the sign of discrete increments of voltages across the electrodes. Thus, conditions are created for the system to return to the mode ensuring the growth of the active power as measured by the active power sensor.

A more complete and thorough understanding of the proposed apparatus for controlling the performance of an MHD-generator will be obtained from the following description of its desing version.

The complete block diagram of the apparatus shown in FIG.6 comprises: an active power sensor 62 the input of which is connected to the A.C. mains 14 (FIG.3); a unit 63 for the periodic and proportional converting of active power integrals into power pulses; a follower-/amplifier 64; a unit 65 for determining the difference between two successive power pulses, a unit 66 for shaping control signals to periodically vary voltages across the electrodes of the MHD-generator in a discrete manner; and synchronization units 67 and 68.

The sensor 62 and the units 63,64,65 and 66 form a successive network of data conversion functions in which the output of every foregoing unit is coupled with the input of the following one. The output (shown by an arrow in FIG.6) of the unit 66 is connected to the control electrodes of thyristors in the gate converters (not shown in FIG.6) just as it is done in the arrangement discussed above.

The synchronization unit 68 made as a square-pulse generator has its input coupled with the active power sensor 62 and its output, connected to the complementary input 69 of the unit 63 for the periodic and proportional converting of active power integrals into power pulses and to the input of the synchronization unit arranged as a 25-Hz voltage generator.

The output of the synchronization unit 67 is connected to a complementary input 70 of the unit 65 for determining the difference between two successive power pulses and to a complementary input 71 of the unit for shaping control signals to periodically vary voltages across the electrodes of the MHD-generator in a discrete manner.

The sensor 62 is provided with a combined filter comprising: a capacitor 72 (FIG.7), connected to secondaries 73 and 74 of a current transformer 75, a resistor 76 and a two-winding choke whose windings 77 and 78 serve to couple the secondaries 73 and 74 of the current transformer 75 with the emitters of transistors 79, 80 and 81, 82 respectively.

Since the choke windings are connected opposite to each other the magnetizing force in the core of the choke will be practically sinusoidal and will have no constant component. This is attributed to the fact that during intervals I and II of operation of the active power sensor 62 when the transistors 79 and 81 are conducting there occurs the positive half-wave of the magnetizing force, whereas during intervals III and IV when the transistors 80 and 82 are conducting there occurs the negative half-wave of the magnetizing force.

The result is that the operation of the two-winding choke becomes equivalent to that of a single-winding choke connected in series with an ohmic resistance to an alternating voltage source.

Figure 3:
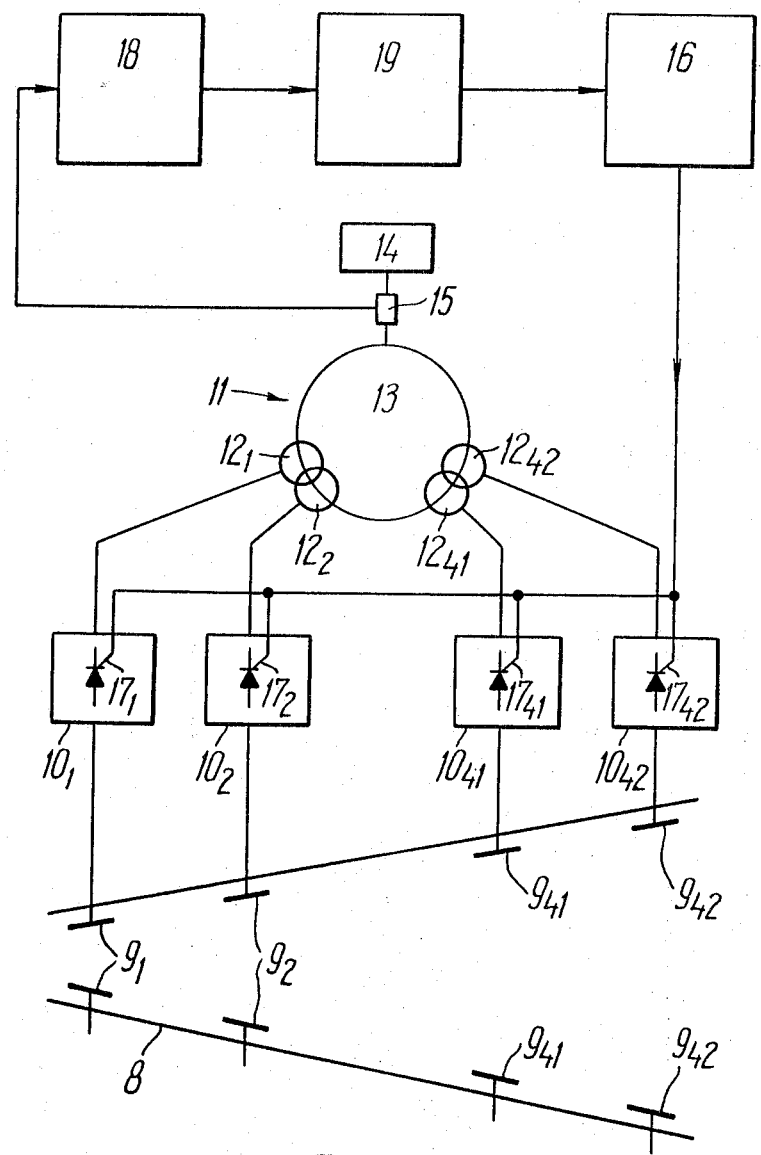
FIG. 3 is a simplified block diagram of a D.C. MHD-generator coupled with an A.C. mains the performance of which is controlled by means of the method, according to the invention.

Voltages $u_{AO}$ and $u_{OB}$ appearing between the points where the transistors 79,80 and 81,82 are connected to the choke windings 77 and 78 (points A and B in the diagram of FIG. 7) and the zero point of the corrent transformer 75 become practically equal to each other and represent the initial system that makes it possible to obtain the curve of the voltage $u_p$ across the resistor, the curve being correspondent to the active component of the first harmonic of the current flowing through the primary 13 of the multiple-winding transformer 12 (FIG.3).

Due to the combined filter, the higher harmonic content in the $u_{AO} - u_{OB}$ voltage does not exceed 1 percent.

The ratings of the resistors 76 and 83, the capacitor 72 and the choke are selected so that the filter has an aperiodic transient response.

The phase shift of the $U_{AO} - U_{OB}$ voltage with respect to the first harmonic of the current flowing through the primary of the multiple-winding transformer is about 60 percent. To measure the power it is required that the voltage across the voltage transformer 84 of the active power sensor 62 should lag by the same angle behind the respective phase voltage in the mains to which the multiple-winding transformer is connected. In the present case this is achieved by means of connecting the primary of the voltage transformer 84 to a source of a linear voltage lagging by 30° behind the phase of the initial voltage, as well as by means of an R-C filter containing a resistor 85 and a capacitor 86 and introducing an additional 30° phase shift. To improve the performance of the transistors 79–82 the circuit arrangement shown in FIG. 7 is provided with intermediate amplification stages using transistors 87 and 88, due to which a square-wave voltage is applied to the emitter-base junctions of the transistors 79 – 82 via the voltage transformer 84. The moments when this voltage crosses the zero level correspond quite accurately to the moments when the zero level is crossed by the sine voltage at the capacitor 86 which simulates the first harmonic of the phase voltage on the primary side of the multiple-winding transformer 11 for the measurement system. The use of intermediate amplification is required to bring down the transistor switching time and hence to ensure a corresponding reduction of the power measurement error. In addition to the voltage $u_p$ resulting curve, the average value of the voltage $U_p$ being correspondent to the active power P on the primary side of the multiple-winding transformer 11, the oscillograms presented in FIG.8 show initial curves of the current $i_1$ and of the voltage $u_1$ in the center phase of the primary 13 of the multiple-winding transformer 11, as well as the current $i_1'$ and the voltage $u_1'$ which correspond to their first harmonics (phase shifted by 60°) and fed to the power measurement system.

FIG.9 presents the relation between the average value of the voltage across the resistor 83 and the active power P on the primary side of the multiple winding transformer 1 as measured with the use of a wattmeter. This characteristic is linear within 1 percent.

Other elements of the active power sensor 62 and the operation of the latter are dealt with in detail in the description of the circuit presented in FIG.4 which contains a similar active power sensor 15.

The unit 63 for the periodic and proportional converting of active power integrals into power pulses contains a resistor 83 (FIG.10) the average voltage across which is proportional to the power as measured from the side of the primary 13 of the multiple-winding transformer 11. Connected in series to the resistor 83 are voltage sources 89 and 90, a choke 91, a diode 92 and a transistor 93. Connected in parallel to the diode 92 - transistor 93 network is a diode 94 and connected in parallel to the transistor 93 is a capacitor 95.

The principle of operation of this unit 63 is based upon the fact that the transistor 93 which is kept at saturation during the whole of the cycle of the current $i_1'$ will get cut-off at the moment the current $i_1'$ going positive crosses the zero level, the cut-off being effected by a short voltage pulse applied in the backward direction to the emitter-base junction of the transistor 93.

Due to this arrangement the capacitor 95 gets charged up to a voltage expressed as $$U_{95} = \sqrt{L \cdot i_{ch}^2/C} = i_{ch}\sqrt{L/C},$$

(9)

where $i_{ch}$ is the current flowing through the choke 91 at the moment the transistor 93 is cut-off, C is the capacitance of the capacitor 95, L is the inductance of the choke 91.

The oscillatory process which might occur when the current flowing through the choke drops to zero and the capacitor 95 gets charged up to the voltage $U_{95}$ is prevented by the diode 92.

The equation 9 follows from the fact that when the current flowing through the choke 91 drops to zero the electromagnetic energy $Li_{ch}^2/2$ which has been stored in it is transferred to the capacitor 95.

The ratings of the circuit components are selected so that the process involving the choke 91 current drop to zero and the capacitor 95 charge is over within a time interval which is considerably shorter than a half-cycle. In practice the duration of this time interval is about $4\times10^{-4}$ sec.

Consequently, the time interval during which the transistor 93 is cut-off should slightly exceed this value so that the energy from the choke 91 is transferred to the capacitor 95 completely and securely.

The saturation of the transistor 93 in the course of the greater part of the half-cycle is ensured by means of selecting the proper rating of a resistor 96 (FIG.11) via which the base of the transistor is coupled with a separate power supply comprising a rectifier bridge 97 and a capacitor 98.

The short pulse produced in the synchronization unit 68 to cut-off the transistor 93 has its leading edge synchronized with the moment the current $i_1'$ corsses the zero line. This pulse is obtained from the secondary 99 of a transformer 100 the voltage of which is applied to the emitter-base junction of the transistor 93 via a capacitor 101 and a resistor 102.

The synchronization unit 68 (FIG.6) comprises a transformer 100 combined with transistors 103 and 104 to form an alternating square-wave voltage oscillator. The moments when this voltage crosses the zero line correspond to the moments when the zero line is crossed by the current $i_1'$ due to the fact that the emitter-base junctions of the transistors 103 and 104 are fed with a total voltage proportional to the current.

When the edges of the square-wave voltage pulses produced by the transformer 100 are sufficiently steep the leading edge of the pulse which cuts-off the transistor 93 will be properly synchronized with the moment the positive-going current $i_1'$ crosses the zero line.

The required duration of this pulse is obtained by means of selecting a proper relationship between the ratings of the capacitor 101 and the resistor 102.

Since the time interval when the transistor 93 is cut-off is relatively short (about 1/20th of a cycle) the relative error, while comparing the active power of the transformer II during two successive cycles, becomes quite small.

To make the following elements of the unit 63 (FIG.7) under consideration function properly the signal of the power corresponding to the active power of the transformer 12 (FIG.3) is subjected to the inverse conversion procedure when an increase of the active power corresponds to a drop of the pulse amplitude at the capacitor 95, while a decrease of the power corresponds to a growth of the amplitude of these pulses.

To this end the in-series network shown in FIG.10 comprises voltage sources 89 and 90 which produce electromotive forces $e_1$ and $E_o$ respectively, acting in the direction opposite to that of the voltage drop across the resistor 83. In the static mode the $e_1$-emf is kept equal to the average voltage drop across the resistor 83 while the $E_o$-emf remains constant irrespective of the mode of operation.

Therefore, under static conditions the active power of the transformer 11 will remain constant during every cycle T while the amplitude of pulses at the capacitor 95 will remain unchanged, the value of this amplitude being determined by and dependant on only the $E_o$-emf, since the voltage across the resistor 83 is compensated for by the $e_1$-emf since $$\int_0^T u_p dt = \int_0^T e_1 dt \qquad (10)$$

A practical circuit arrangement allowing a continuous counter-balance of the voltage across the resistor 83 so that the equation (10) holds true under static conditions, is presented in FIG.11.

The average value of the voltage across the resistor 83 is produced at a capacitor 105 within a sufficient accuracy, the capacitor being coupled with this resistor via a resistor 106 the rating of which is much greater than that of the resistor 83. The capacitor 105 is connected between the base and the collector of a compound transistor 107-108. Thanks to this arrangement the voltage between the emitter and the collector of the transistor 108 will follow that across the capacitor 105 with a small error equal to the voltage drop across the emitter-base junctions of the transistors 107 and 108. As it is evident from the diagram of FIG. 11, the voltage across the emitter-collector junction of the transistor 107 is opposite to the voltage drop across the resistor 83, which, therefore, ensures the above compensation. The collector circuit of the transistor 107 is energized from a separate voltage source, comprising a rectified bridge 109 and a filter capacitor 110. Connected in-series with the transistor 107 is a silicon diode 111 the forward voltage drop across which produces the emf of $E_o$.

If the voltage across the capacitor 110 is sufficiently high, while the rating of a resitor 112 connected to the emitter circuit of the transistor 107 is relatively low it becomes possible to obtain small variations of the current flowing through the transistor 107 and the diode 111 and, consequently, a highly stable voltage across the diode 111 which corresponds to the emf of $E_o$, as well as a minor relative error occurring in the course of counter-balancing the voltage drop across the resistor 83 with a voltage across the transistor 107.

The current flowing through the choke 91 within every cycle of its operation between the intervals when the transistor 93 is cut-off is produced by the voltage which is a resultant one with respect to $u_p$, $E_o$ and $e_1$.

Since by the beginning of every cycle the current flowing through the choke 91 is equal to zero, the value of the current $I_{ch}$ at the end of the cycle T will be determined as $$I_{ch} = \frac{1}{L} \int_0^T (E_0 + e_1 - u_p) dt \qquad (11)$$

The inductance of the choke 91 is selected to be sufficiently high so that the ohmic resistances in the network through which the choke current is flowing might be neglected. The decisive circumstance that makes it possible to dispense with the voltage $e_1$ to compensate for the average value of the voltage $u_p$, but to sense the change of the $$\int_0^T u_p dt$$

value in the given cycle with respect to the previous one, consists in that the voltage $e_1$ follows the average value of the voltage $u_p$ with a sufficiently big delay which corresponds to the time constant (about 0.2 sec) of a network comprising the capacitor 105 and the resistor 106.

Thus, the variation of the value of $e_1$ within two cycles T is small and will produce pactically no effect on the relative accuracy of comparing the value of $$\int_0^T u_p dt$$

within a time period of two cycles.

The reverse dependence of the output pulse amplitude increment of the pulse converter on the magnitude of the $u_p$ voltage average value within a cycle T is clearly seen from the equation 11 which indicates that the growth of $$\int_0^T u_p dt$$

results in a reduction of the total voltage affecting the choke 91. This brings about a decrease of the current $I_{ch}$ and a respective reduction of the voltage pulse amplitude at the capacitor 95.

It should be pointed out that the use of the autocompensation process of the $U_p$ voltage average value discussed above will degrade, to a certain extent, the dynamic performance of the system in case electrical parameters of the MHD-generator undergo excessive variations. At the same time, however, it makes it possible to considerably improve the resolution of the measurement system and to broaden the range of power values at which the present system would operate in a normal mode.

In the absence of the autocompensation of the $U_p$ voltage average value the magnitude of $E_o$ should be intentionally made high so that in case of a maximum active power of the multiple-winding transformer 11, the $E_o$ voltage would exceed the average value $U_p$ of the voltage $u_p$. The allowable amplitude of pulses at the capacitor 95 is limited by the maximum operating voltage across the transistor 93 and, hence, the specific pulse amplitude per power unit which corresponds to the ratio between the pulse amplitude $U_{95max}$ at the capacitor 95 and the $E_o$ value becomes relatively small, thus making it difficult to detect dynamic power variations with a sufficient accuracy. If the voltage $E_o$ is low but the system is provided with the above autocompensation function the ratio $U_{95max}/E_o$ will be much higher (a five to six-fold increase). Hence, a growth of resolution of the measurement system with respect to dynamic power chages is obtained.

A follower/amplifier 64 serves to raise the level of pulses obtained at the capacitor 95 (FIG.7) so that they can be used in the following elements of the system. The follower/amplifier is arranged around a ganged transistor comprising three transistors 113, 114 and 115. The capacitor 95 is connected between the base of the transistor 115 and the collector of the transistor 113 which is coupled with a power supply of about 70 V via a relatively low-rated resistor 116. The power supply comprises a transformer 117, a rectifier bridge 118, a resistor 119 and a filter capacitor 120.

Due to this arrangement the voltage between the emitter and the collector of the transistor 113 repeats the voltage across the capacitor 95 with a rather insignificant error (equal to the voltage drop across the emitter-base junctions of the transistors 113, 114 and 115), provided the pulse amplitude does not exceed 70 V. Since the gain factor of the ganged transistor 113-114-115 is sufficiently high the base current flowing through the transistor 115 will be too low to affect in any noticeable way the process of pulse shaping at the capacitor 95, the process being disturbed only when input stages of the following elements of the system are directly connected to this capacitor.

The required range of loads caused by the input characteristics of the next element of the system, in which the pulse delivered by the transistor 113 follows the pulse at the capacitor 95 with a sufficient accuracy, will be achieved at relatively high values of the power dissipated by the transistor 113 and the resistor 116 (10 W and 40 W respectively).

The unit 65 for determining the difference between two successive pulses (FIGS. 7 and 11) serves, as implied by its name, to detect the difference between two power pulses following each other and appearing at the output of the follower/amplifier 64. The principle of operation of the unit consists in that the first power pulse charges a capacitor 121, which, during the time interval between the first and the second pulses, performs the functions of a memory element, the voltage across this capacitor being then compared against the second power pulse, after which the capacitor 121 is discharged.

If the amplitude of the second pulse exceeds that of the first pulse a resistor 122 will detect the respective difference to the sensed then by the unit 66. This succession of functional events is carried out with the help of transistors 123 and 124 the emitter-base junctions of which are fed with a 25-Hz alternating voltage.

When the first of the two power pulses to be compared is being shaped the transistors 123 and 124 are cut off and the capacitor 121 gets charged up to the amplitude of the pulse. Diodes 125 and 126 prevent the capacitor 121 from getting discharged. When the second power pulse is being shaped the transistor 124 is saturated, and in case the amplitude of the second pulse exceeds that of the first pulse the capacitor 121 will receive an additional charge via the resistor 122 which will thus produce the difference between two successive power pulses to be delivered to the input of the unit 66.

A capacitor 127 whose rating is equal to that of the capacitor 121 serves to level off the output load of the pulse converter during the first and the second pulses. The bias voltage U which is present in the capacitor 121 charge circuit serves to compensate for a voltage drop across the transistor 124 during the charging of the capacitor 127, as well as to compensate for the difference in voltage drop across diodes 126, 128, 125. As soon as in the course of the second pulse shaping its amplitude is compared against that of the first pulse stored in the capacitor 121, the latter will get discharged through the transistor 123 during a relatively short time interval. After the second pulse is over the capacitor 127 will get discharged through the diode 129.

A 25-Hz voltage generator performs the functions of the synchronization unit 67 arranged around two controlled gates 130 and 131 (FIG.14). The gates are simultaneously fed with control pulses having a repetition rate of 50 Hz, the leading edges of the pulses being synchronized, via the transformer 100 discussed above, to the moments the positive-going current $i_1'$ crosses the zero line.

The controlled gates 130 and 131 whose anode circuits contain resistors 132 and 133 respectively are coupled with a D.C. power supply comprising a rectifier bridge 134, a filter capacitor 135 and a transformer 136.

In case control pulses are applied to the two controlled gates 130 and 131 simultaneously the gate that has been conducting will get cut off, while the other one that has been cut off will start conducting. The procedure is made possible due to a switching capacitor 137 which is recharged so that a backward voltage is applied to the gate that has been conducting to drive it to cut-off.

To ensure the reliable operation of the system it is required that the time the cut off gate is kept under the backward voltage should exceed the length of the control pulse. This is achieved by the proper selection of ratings of the resistors 132, 133 and the switching capacitor 137.

The short-term application of a control pulse in the presence of a backward voltage between the anode and the cathode presents no danger for the gates used in the circuit because the power supply produces a relatively low voltage (about 20 V).

The 25-Hz generator is turned on with the use of a key 138 included in the cathode circuit of the controlled gate 130.

The voltage produced by the 25-Hz generator is applied to the winding 139 of a transformer 140 (FIGS. 7 and 13).

Curves characterizing the voltage $u_{137}$, produced by the 25-Hz generator and obtained across the capacitor 137, and the current $i_1'$ are presented in FIG. 15. The delay of the moment the 25 Hz voltage crosses the zero line with respect to the moment when the positive-going current crosses the zero line is attributed to the capacitor 137 recharge process.

The way the 25-Hz voltage is used to control the gates 123 and 124 is presented in FIGS. 7 and 13.

The emitter-base junction of the transistor 124 is connected to the capacitor 137 via a resistor 141 while that of the transistor 123 is connected to the capacitor 137 via the transformer 140 having a quickly-saturated core. Oscillograms showing the 25 Hz voltages $u_{140}$ that control the transistors 123 and 124 and the pulses $u_{95}$ that are compared within one full-wave cycle are also presented in FIG. 15.

During the first half-wave of the 25-Hz voltage the transistor 124 is cut-off by a backward voltage at its emitter-base junction and during the second half-wave, when the polarity of the 25 Hz voltage is reversed, it starts conducting.

The transistor 123 will start conducting only during the interval $t_4 - t_5$ (FIG.15) when the $u_{140}$ voltage pulse passing through the transformer 140 is positive for the emitter-base junction of the former. During the rest of the time this transistor is cut off by the bias voltage U.

The interval $t_4 - t_5$ begins right after the second pulse when the capacitor 121 should get discharged to make the system ready to start another cycle of operation. The parameters of the transformer 140 having a quickly-saturated core are selected so that the interval $t_4 - t_5$ would last for about one third the half-wave of the 25-Hz voltage. During the rest of the time after the core of the transformer 140 is saturated the voltage across the capacitor 137 to which the primary 139 of the transformer 140 is connected via a resistor 142 drops mainly across the latter.

FIG. 16 shows the unit 66 for shaping control signals to vary voltages across the electrodes of the MHD-generator in a discrete manner. This unit presets continuous variations of the voltages across the MHD-generator electrodes coupled with gate converters.

The output parameter of this unit is a voltage delivered from the emitter-collector junction of a transistor 143 and applied to the circuit which adjusts the value of the leading angle $\beta$ of thyristor ingition in the gate converters.

FIG. 17 presents the relationship between the leading angle $\beta$ of thyristor gate ignition and voltage $U_{143}$ across a transistor 143, the relationship being correspondent to the angle $\beta$ adjustment circuit adopted in the system.

The circuit for adjusting the leading angle $\beta$ of thyristor ignition can be arranged as any known phase-shifter designed, for instance, according to the standard vertical principle and is not shown in the drawings.

Within the useful range of angle $\beta$ variations (15° to 95°) this relationship remains practically linear.

Transistors 143 and 144 form a compound device used as a follower/amplifier for the voltage across a capacitor 145 which is connected between the base of a transistor 146 and the collector of a transistor 147.

The collector circuit of the transistor 143 is energized by a D.C. power supply used in the leading angle $\beta$ of thyristor ignition adjustment circuit.

The use of the compound transistor 143-144 makes it possible to obtain a very low base current flowing through the transistor 144 which produces practically no effect on the capacitor 145 recharge process.

The required variations $\Delta\beta$ of the leading angle $\beta$ of thyristor ignition and the respective variations $\Delta U_e$ of voltages across the electrodes are obtained by changing the voltage across the capacitor 145 at the beginning of every operation cycle of the unit 65 for determining the difference between the two successive power pulses.

The capacitor 145 recharge voltage is varied with the use of a switch comprising two thyristors and a switching transistor 150 connected to the anodes of thyristors 148 and 149. The thyristors 148 and 149 are coupled, via resistors 151 and 152 (connected to the anode circuits), with a power supply comprising a rectifier bridge 153 and a filter capacitor 154.

The voltage polarity at the capacitor 150 to which the capacitor 145 is connected via a resistor 155 and the emitter-collector junction of a transistor 156, is reversed when the control circuits of the thyristors 148 and 149 are fed with a control pulse. The process of shaping this pulse will be discussed hereinafter. Then, just as in the 25-Hz voltage generator, the thyristor that has been cut off, starts conducting, while the one that has been conducting gets cut off since the recharge of the capacitor 150 results in its receiving a backward voltage.

Due to the fact that the recharge circuit contains a special compensation function of the voltage across the capacitor 145, the recharge process of the latter always goes on at the same rate. The capacitor 145 voltage compensation is effected by means of repeating this voltage with a reverse sign at the emitter-collector junction of the transistor 147 which is connected, via resistors 157 and 158, to a D.C. power supply comprising a rectifier bridge 159 and a filter capacitor 160.

To increase the current gain the transistor 147 is complemented by the transistor 146 the base of which is connected to the capacitor 145.

Oscillograms of the voltages $U_{161}$ and $U_{145}$ across the capacitors 161 and 145 occurring during various modes of unit 66 operation are presented in FIG. 18 along with the voltage $U_{150}$ across the capacitor 150 and the current $i_1'$.

These oscillograms show the time of events and indicate the relationship between the charge or discharge of the capacitor 145 and the voltage across the anodes of the thyristors 148 and 149.

Consider now the operation of the apparatus described above for controlling the performance of a D.C. MHD-generator whose complete circuit diagram is presented in FIG. 7. All the elements of the power (primary) circuit are similar to those shown in FIG. 3. Since the apparatus under consideration is designed to control the performance of an MHD-generator operating, via a converter, into an A.C. mains of 50 Hz (cycle T=0.02 sec) the names of time intervals used in the description related to the A.C. cycle will correspond to the cycle of an alternating current of 50 Hz. If, for instance, there is a reference two-cycle period of operation that will mean a time interval equal to two cycles of a 50-Hz alternating current, i.e., to 0.04 sec.

If during the two-cycle period of operation the unit 65 for determining the difference between two successive power pulses senses that in the second cycle the active power delivered by the multiple-winding transformer 11 is less than in the first cycle, which is manifested by a voltage pulse appearing at the resistor 122 at the end of the two-cycle period of operation, the unit 66 for shaping control signals to control voltages across the electrodes of the MHD-generator in a discrete manner will operate.

To improve the resolution of the system the pulse from the resistor 122 is made to pass through a step-up transformer 162 and amplified in a ganged transistor 163-164 to be fed, via a decoupling transformer 165, to a transistor 166 which has its collector connected to the control electrodes of the thyristors 148 and 149 via resistors 167 and 168.

To avoid ambiguity and ensure that the control pulse is fed to the thyristors 148 and 149 only in case the active power delivered by the multiple-winding transformer 11 during the second voltage cycle is either equal to, or less than that delivered during the first cycle (within a two-cycle period of the unit 65 operation), the capacitor 145 charge circuit is provided with an adjustable bias which makes it possible to set-in the required mode of operation taking into account the ratings of the particular semiconductor components used in the circuit. Due to this arrangement, the preset bias applied to the base of the transistor 163 in the form of the voltage across a capacitor 169 and the preset bias applied to the emitter of the transistor 166 from a stabilitron 170 make it possible to continuously feed control pulses with a minimum margin to the thyristors 148 and 149 in case the active power delivered by the multiple-winding transformer 11 is constant a priori.

In the apparatus discussed above the effects produced by the unit 65 for determining the difference between two successive power pulses upon the unit 66 for shaping control signals to vary voltages across the electrodes of the MHD-generator in a discrete manner are manifested in the form of changes of the active power between two cycles, the magnitude of any change being less than $10^{-4}$ of the nominal value. In other words, if the active power in the second cycle exceeds that in the first cycle, the difference being just equal to $10^{-4}$ of the nominal value, there will be no control pulse applied to the thyristors 148 and 149 and the unit 66 will not operate.

If the power increase in the second half-period is less than $10^{-4}$ of the nominal value, the power will drop and said unit 66 will be sure to operate. Hence, the operating point will start moving backward along the power characteristic $P=f(U_e)$ of FIG.2 in the direction of power growth.

After debugging and experimental checks the apparatus described above designed to control the performance of an MHD-generator and arranged according to the diagram of FIG. 7 has been commissioned for operation in conjunction with a multiple-element converter set-up.

The manual adjustment of the leading angle $\beta$ of the gate converter thyristor ignition carried out with the use of an variable resistor 171 has been replaced for an automatic process performed by a switch 172 (FIG.7). Instead of the resistor 171 this switch connects, to the circuit controlling the thyristor ingition leading angle, a transistor 143 the voltage across which is varying in the respective way in the course of operation of the apparatus under discussion as it has been described above.

The process that takes place when the MHD-generator is being adjusted to deliver the maximum electric power (the electrical load factor $N_e = 0.5$) after the switch 172 has been operated to automatic control position II are illustrated by oscillograms $u_p$; $i_1'$; $U_{150}$; $U_{95}$ and $U_{105}$ (FIGS. 19 and 26). These oscillograms show the voltage $u_p$ across the resistor 83 which corresponds to the active power delivered by the multiple-winding transformer 11, voltage pulses $u_{95}$ produced at the output of the pulse converter and the voltage $u_{150}$ appearing between the anodes of the thyristors 148 and 149. As it is indicated by the low voltage amplitude at the resistor 83 which corresponds to the amplitude of the current $i_1'$ flowing through the primary 13 of the multiple-winding transformer 11, the leading angle $\beta$ of thyristor ignition in the gate converters was set at the minimum level using manual control means before the switch 172 has been operated to position II.

After the switch 172 is operated to position II (point $t_1$ on the time scale of the oscillograms) the angle $\beta$ will grow as indicated by the shape of the curve for the voltage $u_p$ across the resistor 83. This is due to the discharge of the capacitor 145 which takes place under the effect of the voltage between the anodes of the gates 148 and 149 (during the transient period $t_1 - t_2$ this voltage retains its polarity). Starting from the moment $t_2$ when the curve $P=f(U_e)$ of FIG.2 approaches its maximum the voltage $U_{150}$ will be continuously alternating its polarity and this is just the quasi-stable mode of operation of the proposed apparatus at the maximum of its power characteristic $P=f(U_e)$ that has been discussed above.

The power growth could be followed with the help of pulses appearing at the output of the unit 63 for the periodic and proportional converting of active power integrals into power pulses; the second pulse "b" is a little smaller than the first pulse "a" within the two-cycle period of operation. Starting from the time moment $t_3$ the pulses become equal and the thyristors 148 and 149 pass to the continuous switch-over mode of operation.

The most indicative is the transient process that occurs when the gate converters are energized after the proposed apparatus has been enabled. The oscillogram of the voltage $u_p$ across the resistor 83 (FIGS. 19 and 26) and the respective curve showing the voltage $U_{105}$ across the capacitor 105 which characterizes the average voltage across the resistor 83 and hence the magnitude of the active power P on the primary side of the multiple-winding transformer indicate that the proposed apparatus permits the MHD-generator to pass over from the idling conditions to operating at the maximum level of electric power within 0.15 sec.

The oscillograms in FIGS. 20 and 21 showing the transient process, that would occur if the electrical conductivity of the plasma in the MHD-generator channel is simulated to change by the factor of 2, characterize the operation of the apparatus under the conditions of varying external properties of the MHD-generator electrodes. According to the oscillogram of FIG.20, a two-fold increase of the plasma conductivity results in a transient process of about 0.06 – 0.08 sec. The oscillogram of FIG. 21 characterizing the transient process in case the plasma conductivity is twice as low shows that the duration of the transient process is also 0.06 – 0.08 sec. Hence, the proposed apparatus proves to be able to control the performance of the MHD-generator in a stable way even in case of quite considerable variations of the plasma conductivity.

Statistic properties of the apparatus operating to maintain the electrical load factor $\nu_e$ at various levels within the range from 0.5 to 0.7 are presented in FIGS. 22, 23, 24, and 25 where $\nu_e$ is the electrical load factor, $U_e$ is the voltage across the electrodes,
$E_e$ is the voltage across the electrodes under the idling conditions.

The curves confirm that by means of introducing a mismatch between the phases of the current and voltage in the active power sensor 62 with the help of the resistor 76 and the capacitor 72 it is possible in principle to obtain various values of the electrical load factor differing from 0.05. Moreover, the preset values of the electrical load factor $\nu_e$ are maintained rather accurately although the no-load voltage across the electrodes of the MHD-generator can vary within a very broad range.

In addition to assemblies and parts mentioned in the above description the accompanying drawings show certain auxiliary elements of the apparatus as, for instance, a three-phase power supply transformer 173, decoupling transformers 174 and 175, a power transformer 176 whose functions and operations are evident from their places and connections as shown in the respective drawings.

And, finally, consider the bias voltage applied to the capacitor 121 discharge network which is proportional to the current flowing through the primary of the multiple-winding transformer 11 and to the mains voltage. A change in any of these parameters (the current flowing through the primary of the multiple-winding transformer or the mains voltage) will vary the bias voltage which would ensure the required signal level at the output of the unit 65. The bias voltage proportional to the current flowing through the primary of the multiple-winding transformer is obtained from a transformer 177 connected to points "A" and "B" in the unit 62, a rectifier bridge 178, a resistor 179 and a capacitor 180. The bias voltage proportional to the mains voltage is obtained from the power transformer 176, a rectifier bridge 181, resistors 182 and 183 and a capacitor 184. These bias voltages are applied to the base of a transistor 185 shunted by a capacitor 186.

What we claim is

1. A method of controlling the performance of a D.C. magnetohydrodynamic (MHD) generator by varying voltages across the electrodes of the latter, said method comprising the steps of presetting a required value of the MHD-generator electrical load factor, generating control signals to periodically vary voltages across said electrodes in a discrete manner, monitoring the change of the MHD-generator active power for every time interval equal to the period of the discrete voltage variations across the electrodes, and shaping the generated control signals so as to maintain the preset electrical load factor in response to a monitored change of generator active power.

2. A method of controlling the performance of a D.C. MHD-generator connected to an A.C. mains as claimed in claim 1, wherein the control signals to periodically vary voltages across the electrodes of the MHD-generator in a discrete manner is shaped at a frequency which is twice as low as that of the A.C. mains, while the change of the active power during every time interval equal to two cycles of the A.C. mains voltage is monitored by means of converting the integral of the active power within the cycle of the A.C. mains voltage into a power pulse proportional to this integral and equal to the difference between two successive pulses following each other and constituting a pair.

3. A controller for adjusting the performance of a D.C. MHD-generator, coupled with an A.C. mains via a controllable converter comprising: a means for adjusting voltages across the electrodes of the MHD-generator; a unit for shaping control signals to periodically vary voltages across the electrodes of the MHD-generator in a discrete manner, the output of the unit being coupled with the control input of said converter; an active power sensor facing said A.C. mains; a unit for the periodic and proportional converting of active power integrals into power pulses the input of which is coupled with the output of said active power sensor; a unit for determining the difference between two successive power pulses the input of which is coupled with the output of said unit for the periodic and proportional converting of active power integrals into power pulses, while the output of which is coupled with the input of said unit for shaping control signals to periodically vary voltages across the electrodes of the MHD-generator in a discrete manner.

4. A controller for adjusting the performance of a D.C. MHD-generator as claimed in claim 3, wherein said unit for shaping control signals to periodically vary voltages across the electrodes of the MHD-generator in a discrete manner is made as a switch using two thyristors and a switching capacitor delivering output singals, the input signals being fed to the control electrodes of the thyristors.

5. A controller for adjusting the performance of a D.C. MHD-generator as claimed in claim 3 wherein said unit for the periodic and proportional converting of active power integrals into power pulses uses a transistor operating in the key mode that is connected in-series with a linear choke and contains a network of a capacitor and a diode connected in series, the network being connected between the emitter and the collector of said transistor.

6. A controller for adjusting the performance of a D.C. MHD-generator as claimed in claim 3 wherein said unit for determining the difference between two successive power pulses comprises: two capacitors serving to compare said power pulses; a transistor serving as a discharge network for one of the capacitors; a diode combined with said transistor to form a discharge network of the second capacitor; and another transistor ensuring the discharge of the second capacitor.

* * * * *